United States Patent
Bichot et al.

(10) Patent No.: US 8,750,246 B2
(45) Date of Patent: Jun. 10, 2014

(54) QUALITY OF SERVICE CONTROL IN A WIRELESS LOCAL AREA NETWORK

(75) Inventors: Guillaume Bichot, la Chapelle Chaussee (FR); Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 780 days.

(21) Appl. No.: 10/573,109

(22) PCT Filed: Sep. 30, 2003

(86) PCT No.: PCT/US03/30868
§ 371 (c)(1),
(2), (4) Date: Mar. 23, 2006

(87) PCT Pub. No.: WO2005/041446
PCT Pub. Date: May 6, 2005

(65) Prior Publication Data
US 2007/0058535 A1    Mar. 15, 2007

(51) Int. Cl.
*H04W 4/00* (2009.01)
*H04L 12/26* (2006.01)

(52) U.S. Cl.
USPC . 370/332; 370/389; 370/395.21; 370/395.42; 370/401

(58) Field of Classification Search
USPC .............. 370/328, 333, 389, 395.3, 329, 332, 370/386, 395.21, 395.41, 395.42, 395.53, 370/401
See application file for complete search history.

(56) References Cited

U.S. PATENT DOCUMENTS

| | | | | |
|---|---|---|---|---|
| 5,267,232 A | * | 11/1993 | Katsube et al. | 370/230 |
| 5,371,731 A | * | 12/1994 | Pratt et al. | 370/216 |
| 5,694,390 A | * | 12/1997 | Yamato et al. | 370/230 |
| 5,787,080 A | * | 7/1998 | Hulyalkar et al. | 370/310.2 |
| 6,094,431 A | * | 7/2000 | Yamato et al. | 370/395.21 |
| 6,175,569 B1 | * | 1/2001 | Ellington et al. | 370/401 |
| 6,366,581 B1 | * | 4/2002 | Jepsen | 370/397 |
| H2051 H | * | 11/2002 | Zhu et al. | 370/395.21 |
| 6,567,396 B1 | | 5/2003 | Pohjanvouri et al. | |
| 6,694,369 B1 | * | 2/2004 | Vepa et al. | 709/228 |
| 6,775,283 B1 | * | 8/2004 | Williams | 370/392 |
| 6,944,159 B1 | * | 9/2005 | Fotedar et al. | 370/392 |
| 6,947,739 B2 | * | 9/2005 | Yokoyama | 455/426.2 |
| 6,980,549 B1 | * | 12/2005 | Shabtay et al. | 370/392 |

(Continued)

FOREIGN PATENT DOCUMENTS

JP    2001044968    7/2001
JP    2002252633    9/2002

(Continued)

OTHER PUBLICATIONS

Search Report Dated Jan. 8, 2004.

*Primary Examiner* — Benjamin H Elliott, IV
(74) *Attorney, Agent, or Firm* — Robert D. Shedd; Robert B. Levy

(57) ABSTRACT

The Quality of Service (QoS) level/service level within a wired network associated with a wireless Local Area Network (LAN) is controlled by assigning to each incoming information frame a Virtual Local Area Network (VLAN) number in accordance with the QoS level/service level determined for that frame. The frame is then routed in the network in accordance with the VLAN number to assure that the path(s) carrying the frame have the requisite characteristics, such as bandwidth, to satisfy the determined QoS level/service level.

18 Claims, 2 Drawing Sheets

(56) References Cited

U.S. PATENT DOCUMENTS

| | | | |
|---|---|---|---|
| 7,031,341 B2 * | 4/2006 | Yu | 370/469 |
| 7,079,508 B2 * | 7/2006 | Ayyagari et al. | 370/329 |
| 7,088,714 B2 * | 8/2006 | Athreya et al. | 370/389 |
| 7,133,420 B2 * | 11/2006 | Chang et al. | 370/496 |
| 7,164,656 B2 * | 1/2007 | Foster et al. | 370/235 |
| 7,173,935 B2 * | 2/2007 | Lou et al. | 370/395.5 |
| 7,283,561 B1 * | 10/2007 | Picher-Dempsey | 370/468 |
| 7,293,094 B2 * | 11/2007 | Vaman et al. | 709/227 |
| 7,324,517 B1 * | 1/2008 | Sundaresan et al. | 370/392 |
| 7,370,105 B2 * | 5/2008 | Lebourg et al. | 709/224 |
| 7,376,191 B2 * | 5/2008 | Melick et al. | 375/259 |
| 7,376,828 B1 * | 5/2008 | Voit et al. | 713/153 |
| 7,415,003 B1 * | 8/2008 | Ogura et al. | 370/351 |
| 7,417,995 B2 * | 8/2008 | Rabie et al. | 370/401 |
| 7,428,216 B2 * | 9/2008 | Siddiqui et al. | 370/230.1 |
| 2002/0022483 A1 | 2/2002 | Thompson et al. | |
| 2002/0027906 A1 * | 3/2002 | Athreya et al. | 370/386 |
| 2002/0037010 A1 * | 3/2002 | Yamauchi | 370/395.53 |
| 2002/0055990 A1 * | 5/2002 | Vaman et al. | 709/220 |
| 2002/0067729 A1 * | 6/2002 | Fukuda et al. | 370/395.21 |
| 2002/0101870 A1 * | 8/2002 | Chase et al. | 370/389 |
| 2002/0119783 A1 * | 8/2002 | Bourlas et al. | 455/453 |
| 2002/0150041 A1 * | 10/2002 | Reinshmidt et al. | 370/216 |
| 2002/0191572 A1 * | 12/2002 | Weinstein et al. | 370/338 |
| 2003/0035398 A1 * | 2/2003 | Sato | 370/338 |
| 2003/0055968 A1 | 3/2003 | Hochmuth et al. | |
| 2003/0087629 A1 * | 5/2003 | Juitt et al. | 455/411 |
| 2003/0095554 A1 | 5/2003 | Shimizu | |
| 2003/0103520 A1 * | 6/2003 | Chen et al. | 370/444 |
| 2003/0227373 A1 * | 12/2003 | Lou et al. | 340/310.01 |
| 2004/0032868 A1 * | 2/2004 | Oda et al. | 370/389 |
| 2004/0095889 A1 * | 5/2004 | Chang et al. | 370/238 |
| 2005/0066166 A1 * | 3/2005 | Chin et al. | 713/165 |
| 2005/0174943 A1 * | 8/2005 | Wang | 370/235 |
| 2007/0058535 A1 * | 3/2007 | Bichot et al. | 370/230 |
| 2008/0056295 A1 * | 3/2008 | Loda et al. | 370/437 |
| 2008/0285574 A1 * | 11/2008 | Teener | 370/401 |

FOREIGN PATENT DOCUMENTS

| | | |
|---|---|---|
| JP | 2003158539 | 5/2003 |
| JP | 2003249947 | 5/2003 |
| JP | 2003-244185 A | 8/2003 |
| JP | 2003273893 | 9/2003 |
| WO | WO97/36405 | 10/1997 |
| WO | WO0013436 | 3/2000 |
| WO | WO0163849 | 8/2001 |
| WO | WO02/30056 | 4/2002 |
| WO | WO03048957 | 6/2003 |

* cited by examiner

QUALITY OF SERVICE CONTROL IN A WIRELESS LOCAL AREA NETWORK

The applicants hereby claim the priority under 35 USC 119(a) of International Application PCT/US2003/030868, filed Sept. 30, 2003 and was published in accordance with PCT Article 21(2) on May 6, 2005 in English.

TECHNICAL FIELD

This invention relates to a technique for controlling traffic in a Wireless Local Area Network (LAN) to achieve a desired Quality of Service (QoS) level/service level.

BACKGROUND ART

Advances in the field of wireless LAN technology have resulted in the emergence of publicly accessible wireless LANs (e.g., "hot spots") at rest stops, cafes, libraries and similar public facilities. Presently, wireless LANs offer mobile terminal users access to a private data network, such as a Corporate Intranet, or a public data network such as the Internet. The relatively low cost to implement and operate a wireless LAN, as well as the available high bandwidth (usually in excess of 10 Megabits/second) makes the wireless LAN an ideal access mechanism through which the mobile terminal user can exchange packets with an external entity.

A mobile terminal user accessing a wireless LAN can send and receive traffic having different QoS levels/service levels. For example, a mobile terminal user could send voice traffic, which has greater sensitivity to latency delays than data. Different types of data can have different QoS level/service level requirements. For example, streaming video typically requires far greater bandwidth than simple text messages. Present day Wireless LANs typically provide limited QoS levels/service levels. For example, an optional feature of the IEEE 802.11 protocol standard utilized by many wireless LANs requires polling of each user by an associated Wireless LAN Access Point (AP) in order to grant user access, thus permitting implementation of one or more limited QoS level/ service level control schemes. With the ETSI/Hipperlan2 standard, the wireless LAN utilizes the Medium Access Control (MAC) protocol to provide a connection-oriented mechanism whereby each mobile terminal user can establish a communications session with the AP and negotiate for radio resources to obtain a desired QoS levevservice level. However, such present day schemes for controlling QoS levels/ service levels only address management of the radio resources of a given AP. Such schemes do not address the management of resources within a wired network associated with the wireless LAN.

Thus, there is a need for a technique for managing QoS levels within a wired network associated with a wireless LAN.

BRIEF SUMMARY OF THE INVENTION

Briefly, in accordance with a preferred embodiment of the present principles, there is provided a method for controlling Quality of Service (QoS) levels/service levels within a wired network associated with a wireless Local Area Network (LAN). The method commences upon the receipt in the network of at least one frame of information from a mobile terminal user. A determination is then made regarding the appropriate QoS level/service level for that information frame. The QoS level/service level for the frame can be established in accordance with the source of the frame (i.e., the identity of the sending mobile terminal user). Alternatively, the mobile user can request a specific QoS level/service level for an upcoming communication session on a dynamic basis. Once the QoS level for the frame is determined, then an identifier, typically in the form of a Virtual Local Area Network (VLAN) number, is associated with the frame to designate the required QoS level/service level. Normally, the VLAN number designates the identity of the network endpoint destined to receive the frame in accordance with the IEEE 802.1Q standard. However, in accordance with present principles, the VLAN number is used in the network to select the appropriate path associated with a QoS level. The frame is routed in the network in accordance with the VLAN number associated with the frame.

DETAILED DESCRIPTION

Figure 1:
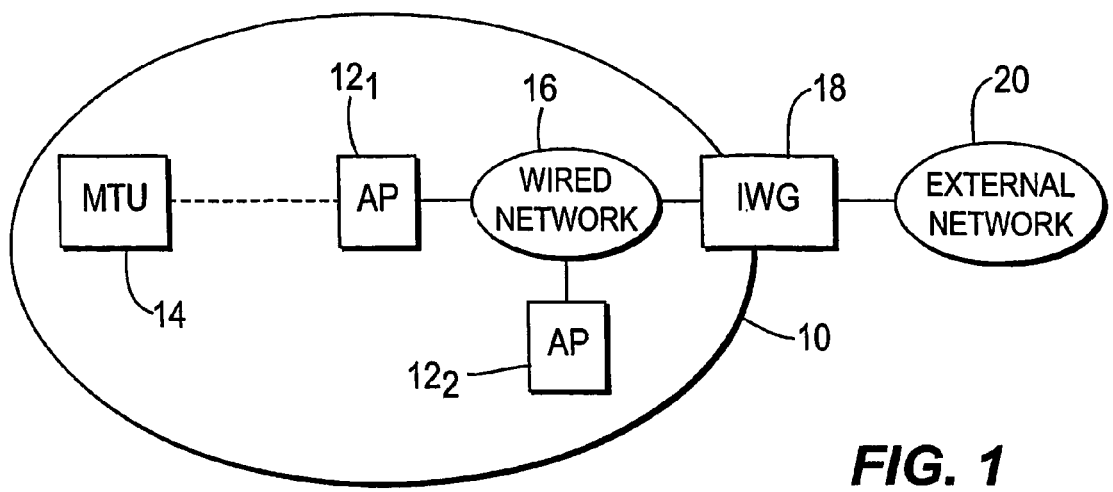
FIG. 1 depicts a block schematic diagram of a wireless LAN in accordance with the prior art.

FIG. 1 depicts a block schematic diagram of a wireless Local Area Network (LAN) 10 in accordance with the teachings of the prior art. The wireless LAN 10 includes at least one and preferably a plurality of Access Points (APs), exemplified by APs $12_1$ and $12_2$. Each AP, such as AP $12_1$, includes a radio transceiver for broadcasting radio frequency signals to, and for receiving radio frequency signals from one or more Mobile Terminal Users (MTUs), exemplified by MTU 14. Each AP thus serves as a gateway to enable the MTU 14 to down load traffic from, and to upload traffic to, a wired network 16 associated with the wireless LAN 10. The traffic exchanged between each MTU 14 and the wired network 16 can include voice as well as data, the later typically taking the form of Internet Protocol (IP) packets formatted in Ethernet frames.

An Inter-Working Gateway (IWG) 18 provides a communications path between the wired network 16 and an external network 20 which can include a private data network, a corporate intranet or a public data network such as the Internet, or a combination thereof. The IWG 18 not only interworks the wired network 16 and the external network 20, but also performs Authorization, Authentication and Accounting (AAA) functions. In other words, the IWG 18 serves to authorize the MTU 14 to obtain service, as well as to authenticate the MTU upon each access to the wireless LAN 10. Further, after authenticating the MTU 14, the IWG 18 accounts for the service rendered to the MTU for billing purposes.

The IWG 18 provides limited QoS level/service level management within the prior art Wireless LAN 10. At best, the IWG 18 can control each of APs $12_1$ and $12_2$ to provide the radio resources needed to achieve a prescribed QoS level/ service level for traffic exchanged between each AP and associated MTU. However, the wired network 16 inside of the wireless LAN 10 typically uses the default Medium Access Protocol (MAC), which in turn, employs Carrier Sense Multiple Access (CSMA), which does not allow for QoS level management. At best, bandwidth is shared among all contenders and the service level is said to be best effort.

Figure 2:
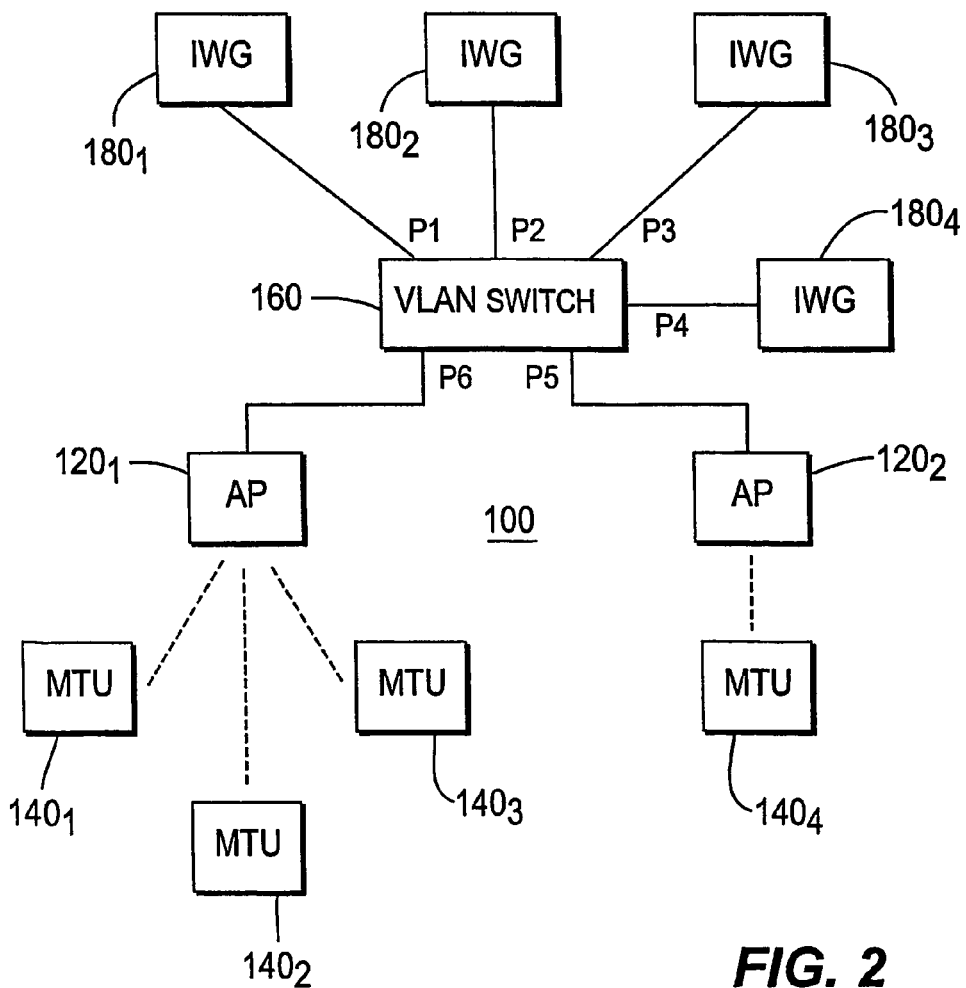
FIG. 2 depicts a block schematic diagram of a first preferred embodiment of a wireless LAN in accordance with the present principles.

FIG. 2 depicts a wireless LAN 100 in accordance with a first preferred embodiment of the present principles. The LAN 100 includes at least one and preferably, a plurality of Access Points (APs), best exemplified by APs $120_1$, and $120_2$. Each AP provides radio access to one or more Mobile Terminal Users (MTUs), as exemplified by MTUs $140_1$, $140_2$, $140_3$, and $140_4$. In the illustrated embodiment, the AP $120_1$ provides radio access to the MTUs $120_1$-$120_3$, whereas the AP $120_2$ provides radio access to the MTU $140_4$. However, each of the APs $120_1$ and $120_2$ has the capability of providing radio access to multiple MTUs in the same manner as each of the APs $12_1$ and $12_2$ of FIG. 2.

Figure 3:
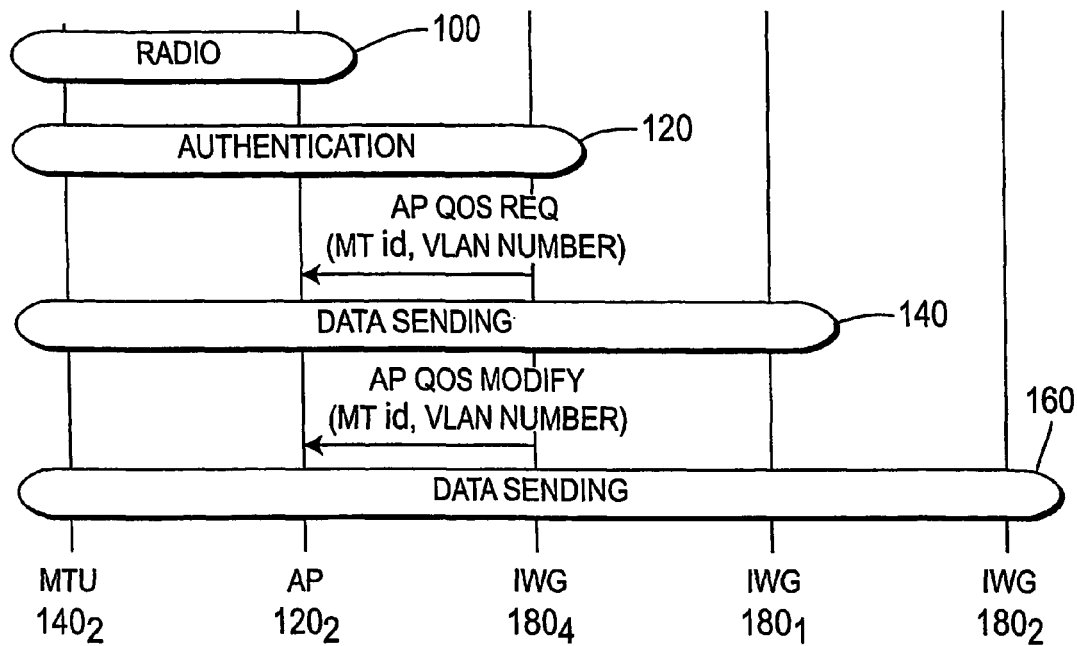
FIG. 3 depicts a time sequence of the events that occur within the network of FIG. 2 to control traffic to meet desired QoS levels.

At the heart of the wireless LAN 100 is a wired network in the form of an Ethernet Switch 160 having Virtual Local Area Network (VLAN) capability, that is the ability to route each information frame in accordance with an identifier (i.e., a VLAN number) associated with the frame. The VLAN switch 160 controls the traffic flow between each of the APs $120_1$ and $120_2$ and one of a set of routing Inter-Working Gateways (IWGs), exemplified by IWGs $180_1$, $180_2$ and $180_3$, in accordance with a determined QoS level. As depicted in FIG. 3, each of the routing IWGs $180_1$-$180_3$ has a connection to a corresponding one of the ports P1-P3, respectively, of the VLAN switch 160. Each of the APs $120_1$ and $120_2$ has a connection to each of ports $P_6$ and $P_7$, respectively.

In addition to the routing IWGs $80_1$-$180_3$, the wireless LAN 100 of FIG. 2 includes an administrative IWG $180_4$ connected to port P4 of the VLAN switch 160. The IWG $180_4$ serves as a controller. In that regard, the IWG $180_4$ hosts an authentication proxy server (not shown) for performing the same Authorization, Authentication, and Administrative (AAA) functions as performed by the IWG 18 of FIG. 1. As part of the AAA functions it performs, the administrative IWG $180_4$ maintains a record for each MTU that designates an appropriate QoS level/service level for information frames received at an associated AP from each MTU. For example, the MTU $140_1$ could subscribe to a higher grade of service as compared to the MTU $140_2$. From such knowledge, the administrative IWG $180_4$ assigns an appropriate Virtual Local Area Network (VLAN) number for each frame that originates from each MTU. Normally, the VLAN number designates the identity of the network end-point destined to receive the frame in accordance with the IEEE 802.1Q standard. However, in accordance with present principles, the VLAN number used in the network to select the appropriate path (i.e., switch port) associated with a particular QoS level/service. The administrative IWG $180_4$ provides such VLAN number assignments to each AP. In the preferred embodiment, each of the APs $120_1$ and $120_2$ act Ethernet bridge devices for associating with each incoming frame an identification (i.e., the VLAN number) that designates the appropriate QoS level/service level accorded that frame.

Rather than rely on a static QoS level/service set during initiation of a communications session with the wireless LAN 100, each MTU could request a particular QoS level/service level for a new upcoming session on a dynamic basis. Stated another way, an MTU, such as MTU $140_4$, could send a request that one or more subsequently transmitted frames should be accorded a particular QoS level/service level. The AP $120_2$ forwards such a QoS level/service level request to the administrative IWG $180_4$, which in turn, instructs the AP to assign such frames a VLAN number that designates the requested QoS levevservice level.

The VLAN switch 160 in the wireless LAN 100 of FIG. 2 routes information frames from one of APs $120_1$ and $120_2$ to one of the routing IWGs $180_1$-$180_3$ in accordance with the VLAN number assigned to each frame by each AP. The VLAN number associated with each frame enables the VLAN switch 160 to select the proper path for the received frame. As discussed in detail with respect to FIG. 3, when each MTU, such as MTU $140_1$ for example, initiates a communication session, that MTU not only receives an identifying IP address, but also receives an IP address for the routing IWGs $180_1$-$180_3$. Although each of the routing IWGs $180_1$-$180_3$ has the same IP address, each typically has a different QoS level/service level. Therefore, the VLAN switch 160 uses the VLAN number associated with each information frame received from an associated one of APs $120_1$, and $120_2$ to route the frame on an appropriate path (i.e., to route the frame to the appropriate one of the routing IWGs $180_1$-$180_3$) to maintain the proper QoS level/service.

FIG. 3 illustrates a timing chart that depicts the sequence of events associated with QoS levevservice level control within the network 100 of FIG. 2. Initially, a MTU, such as MTU $140_2$ of FIG. 2, commences a communications session with the wireless LAN 100 by first establishing radio communication with an AP, such as AP $120_1$ of FIG. 2 during event 100 of FIG. 3. After establishing a communications session during step 100, the administrative IWG $180_4$ of FIG. 2 authenticates the MTU $140_2$ during event 120. As mentioned previously, during the course of authenticating the MTU $140_2$, the administrative IWG $180_4$ will assign an address (i.e., a source address) to the MTU for identification purposes in the wireless LAN 100 of FIG. 2. Further, the IWG $180_4$ will also provide to the MTU $140_2$ with the IP address (i.e., the destination address) of the routing IWGs $180_1$-$180_4$. Additionally, in accordance with present principles, the administrative IWG $180_4$ will also determine appropriate QoS level/service for the frame in accordance with the identity of the originating MTU $140_2$ and communicate that information to the AP $120_1$. The AP $120_1$ will then assign to each incoming information frame a VLAN number that designates the QoS level/service level determined by the administrative IWG $180_4$ prior to routing the frame to the VLAN switch 160 for subsequent routing to the appropriate routing IWG, say IWG 1801 during event 140.

As mentioned previously, the originating MTU (i.e., MTU $140_2$ in FIG. 2) could request a particular QoS level/service/level different from the static QoS level/service level set during initial commencement of the communications session. In response to such a request received through the AP $120_1$ in communication with the MTU $140_2$, the administrative IWG $180_4$ will instruct that AP to assign the appropriate VLAN number designating the requested QoS level/service level. In this way, the VLAN switch 160 will route the frames in accordance with the assigned VLAN number so that the frames are routed on the appropriate path to assure the proper QOS level/service level.

Figure 4:
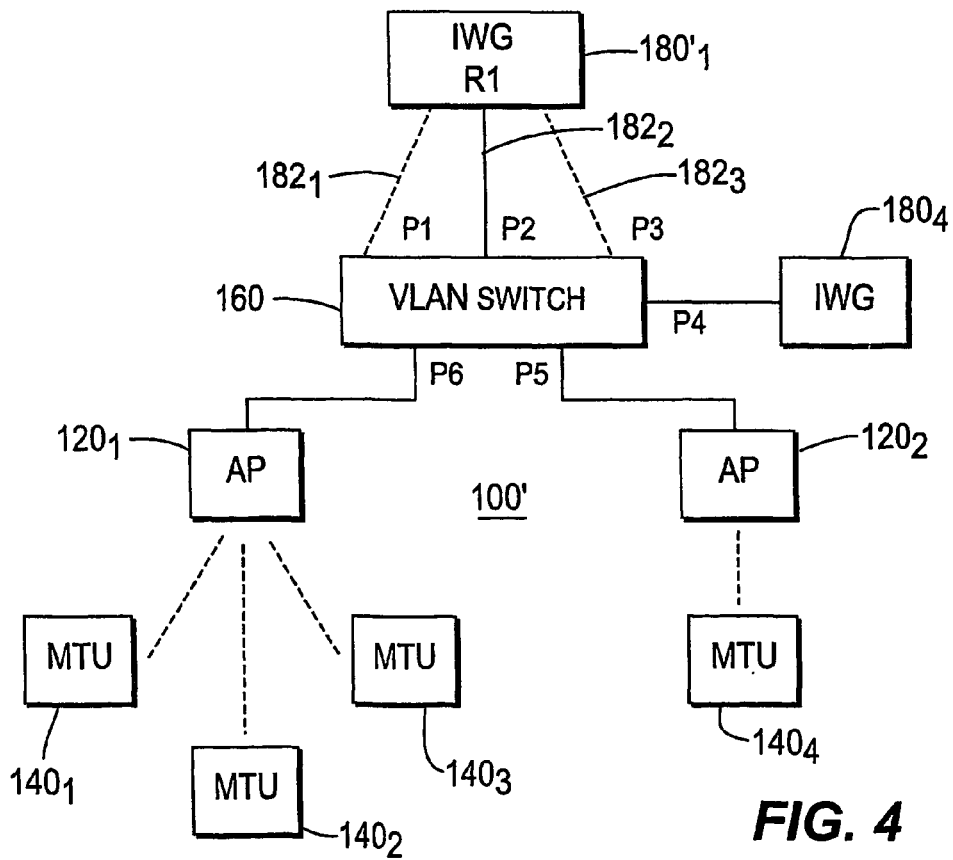
FIG. 4 depicts a block schematic diagram of a second preferred embodiment of a wireless LAN in accordance with the present principles.

FIG. 4 depicts a block schematic diagram of an alternate preferred embodiment of a wireless LAN network 100' for controlling QoS levels in accordance with present principles. The wireless LAN network 100' of FIG. 4 shares many elements in common with the wireless LAN network 100 of FIG. 2 and therefore, like references have been used to identify like elements. The wireless LAN 100' of FIG. 4 differs from the wireless LAN 100 of FIG. 2 with respect to the number of routing IWGs. As described previously, the wireless LAN 100 of FIG. 2 includes three separate IWGs $180_1$-$180_3$, each connected to a separate one of ports P1-P3, respectively of the VLAN switch 160. By comparison, the wireless LAN network 100' of FIG. 4 includes a single IWG router $180_1$' connected to each of the ports P1-P3 of the VLAN switch 160 via a separate one of interfaces $182_1$-$182_3$, respectively.

The interfaces $182_1$-$182_3$ typically each have different QoS level/service level parameters (e.g., for example different bandwidth). Upon receipt of an information frame from a particular AP, such as AP $120_1$ of FIG. 4, the VLAN switch 160 selects at least one of the interfaces $182_1$-$182_3$ in accordance with the VLAN number assigned by that AP for routing the frame to the IWG $180_1$'. In this way, the VLAN switch 160 of FIG. 4 routes the frame on the appropriate path to meet the designated QoS level/service level.

The foregoing describes a technique for controlling Quality of Service (QoS) levels/services in a wired network associated with a wireless LAN by routing the traffic pursuant to an identifier associated traffic that designates the QoS level/service level.

The invention claimed is:

1. A method for controlling Quality of Service (QoS) levels/service levels within a wired network associated with wireless Local Area Network (LAN), the wired network having different paths for carrying information frames received from at least one mobile terminal user, comprising the steps of:
   receiving at an access point of the wireless LAN at least one information frame from the at least one mobile terminal user;
   determining a QoS level/service level for the received at least one information frame;
   wherein the QoS level/service level can be set based on at least one of: a dynamic basis, and a request from the at least one mobile terminal user;
   assigning, at the access point, a Virtual Local Area Network (VLAN) number to the received at least one information frame, the VLAN number designating the QoS level/service level; and
   routing the at least one information frame in the wired network along at least one path having a transmission capability sufficient to provide the QoS level/service level identified by the VLAN number.

2. The method according to claim 1 wherein the QoS level/service level is determined from the identity of the mobile terminal user that originated the at least one information frame.

3. The method according to claim 1, wherein the QoS level/service level is determined in accordance with a QoS level/service level request received from the at least one mobile terminal user.

4. The method according to claim 3, wherein the request received from the at least one mobile terminal user allows the QoS level/service level to be changed on a dynamic basis.

5. The method according to claim 1 wherein the step of receiving the at least one information frame comprises the step of receiving an IP packet in an Ethernet Frame.

6. The method according to claim 1 wherein the step of routing the at least one information frame comprises the step of routing the at least one information frame to one of a plurality of separate destinations.

7. The method according to claim 1 wherein the step of routing the at least one information frame comprises the step of routing the at least one information frame to one destination across a selected one of a plurality of interfaces.

8. The method according to claim 7, wherein the plurality of interfaces each has a different QoS level/service level.

9. A wireless Local Area Network (LAN) for routing received information frames, the wireless LAN associated with a wired network having different paths and Quality of Service (QoS) levels/service levels for carrying information frames received from at least one mobile terminal user, the wireless LAN comprising:
   at least one Access Point for receiving radio traffic from at least one mobile terminal and for communicating such traffic in the form of at least one information frame;
   an administrative gateway for establishing a Quality of Service (QoS) level/service level for the at least one information frame and for instructing the at least one Access Point to assign to the at least one information frame a Virtual Local Area Network (VLAN) number to identify at least one network path through the wired network having transmission capability in accordance with the QoS level/service level established for the at least one information frame; wherein the QoS level/service level can be set based on at least one of: a dynamic basis, and a request from the at least one mobile terminal user; and
   a switch for routing the at least one information frame to a destination along the at least one network path selected in accordance with the assigned VLAN number.

10. The wireless LAN according to claim 9 wherein the switch is a Virtual Local Area Network (VLAN) capable Ethernet switch.

11. The wireless LAN according to claim 9 further including a plurality of routing gateways, each comprising a destination for the at least one information frame routed by the switch in accordance with the VLAN number assigned to the at least one information frame.

12. The wireless LAN according to claim 9 further including a routing gateway, having a plurality of interfaces, each interface providing a path for carrying the at least one information frame routed by the switch in accordance with the VLAN number assigned to the at least one information frame.

13. The wireless LAN according to claim 12, wherein the plurality of interfaces each has a different QoS level/service level.

14. A method for controlling Quality of Service (QoS) levels/service levels within a wired network associated with wireless Local Area Network (LAN), the wired network having different paths for carrying information frames received from at least one mobile terminal user, comprising the steps of:
   receiving at an access point of the wireless LAN at least one information frame from the at least one mobile terminal user;
   determining a QoS level/service level for the received at least one information frame;
   wherein the QoS level/service level can be set on a dynamic basis in accordance with a request from the at least one mobile terminal user;
   assigning, at the access point, a Virtual Local Area Network (VLAN) number to the received at least one information frame, the VLAN number designating the QoS level/service level; and
   routing the at least one information frame in the wired network along at least one path having a transmission capability sufficient to provide the QoS level/service level identified by the VLAN number.

15. The method according to claim 14 wherein the QoS level/service level is determined from the identity of the mobile terminal user that originated the at least one information frame.

16. The method according to claim 14 wherein the step of receiving the at least one information frame comprises the step of receiving an IP packet in an Ethernet Frame.

17. The method according to claim 14 wherein the step of routing the at least one information frame comprises the step of routing the at least one information frame to one of a plurality of separate destinations.

18. The method according to claim 14 wherein the step of routing the at least one information frame comprises the step of routing the at least one information frame to one destination across a selected one of a plurality of interfaces.

* * * * *